(No Model.)
S. C. ROBINSON.
DITCHING MACHINE.
No. 244,934. Patented July 26, 1881.
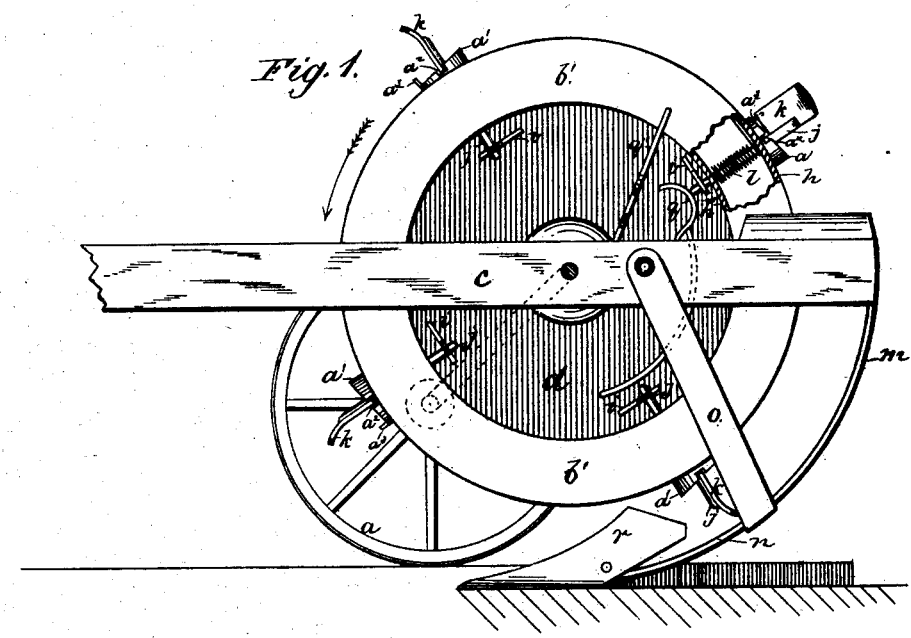
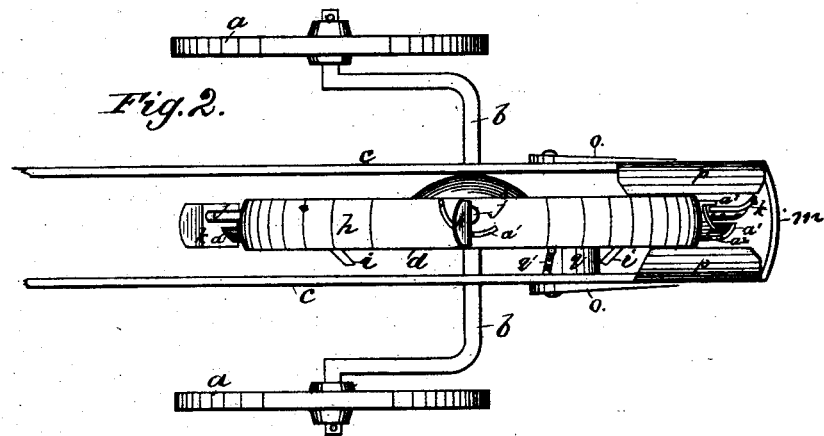
WITNESSES:
W. W. Hollingsworth
John C. Kernon
INVENTOR:
Saml. C. Robinson
BY
ATTORNEYS.

UNITED STATES PATENT OFFICE.

SAMUEL C. ROBINSON, OF PEMBERTON, OHIO.

DITCHING-MACHINE.

SPECIFICATION forming part of Letters Patent No. 244,934, dated July 26, 1881.

Application filed April 29, 1881. (No model.)

*To all whom it may concern:*

Be it known that I, SAMUEL C. ROBINSON, of Pemberton, in the county of Shelby and State of Ohio, have invented a new and useful Improvement in Ditching-Machines; and I do hereby declare that the following is a full, clear, and exact description of the same, reference being had to the accompanying drawings, forming part of this specification, in which—
Figure 1 is a side elevation of my improved ditching-machine, and Fig. 2 is a plan view of the same.

My invention relates to improvements in a ditching-machine for which I made an application for Letters Patent filed April 19, 1881; and it consists, first, in constructing the outer rim of the ditching-wheel so that it shall be oval or convex in cross-section, and provided with semi-rotating spades, whereby the earth on the rim will tend to slide off on each side and not adhere to the rim, as it would do were the rim flat, as in my former invention above referred to, the convex form of rim also preventing the earth being carried forward and dropped in front of the wheel and in its way.

My improvement further consists of a series of curved cams arranged on the outer rim of the ditching-wheel, so that a cam will be under each spade, each cam being provided with a notch to receive and positively hold the spade across the outer rim in a working position and prevent it from turning sidewise in excavating a ditch and elevating the earth, and having, also, a pin on its outer end, intended to arrest suddenly the motion of the spade in discharging the earth from it, and thereby force from the spade all particles of earth adhering to it.

My improvement further consists of a cam or inclined plane secured to the frame to raise each spade out of its notch, and a rod to move each spade back over its notch after the discharge of the earth, and a spring attached at one end to the ditching-wheel and coiled around a spade-shank to impart a quick rotary motion to the shank and spade to discharge the earth, and also so arranged as to hold the spade in position in its notch in excavating and elevating the earth by drawing it downward, and when the spade, released from the notch, has been rotated backward over the notch by the rod the spring draws the spade downward into its notch and holds it there.

My improvement further consists in connecting the outer and inner rims of the ditching-wheel with a circular metallic ring or plate made in one or several pieces, to prevent earth from collecting and interfering with the operation of the springs. The circular rings or plates or sections are so arranged as to be readily removable to insert, remove, or repair a spring or for other purposes.

My improvement also consists of guide-plates for the earth discharged by the spades secured to the opposite sides of the frame at the upper end of the chute and inclined inwardly, to remove all particles of earth that may adhere to the sides of the ditching-wheel, the guide-plates performing the double functions of discharging the raised earth outside the ditch and acting as scrapers for the sides of the ditching-wheel, as hereinafter more fully set forth.

In the accompanying drawings, $a\ a$ are the wheels for supporting and carrying the ditching mechanism, connected together by an axle, $b$, having a double crank at its middle, the horizontal portion of which passes through holes in the frame $c$, to the forward end of which the propelling-power is applied, and also through a central hole in the ditching-wheel $d$, the latter and the frame $c$ being pivoted on the horizontal part of the double crank, and the ditching-wheel adapted to be raised entirely off the ground for transporting the machine from place to place or lowered for excavating purposes by appropriate mechanism.

$h$ is an outer rim, provided with a series of holes and secured to the wheel at its circumference. The outer rim, $h$, is oval or convex in cross-section, by which construction the earth falling from the spades on the rim will slide off on each side of it and not adhere to it, as it would do were the rim flat, the convex form of rim also preventing the earth from being carried forward and dropped in front of it and in its path and way.

$h'$ represents an inner rim, concentric with the outer rim, and provided, also, with a series of holes lying radially opposite the holes in the outer rim. Through each set of opposite holes in the outer and inner rims the shank $j$ of a curved spade, $k$, passes, having a bell-crank arm, $i$, rigidly secured to its lower end, inside the inner rim, the outer end of the spade-shank $j$ projecting out beyond the outer rim, and having secured to it, at one side of the spade, the spade $k$, curved at its outer end and made oval or convex at its outer edge, so as to be forced more readily into the earth.

$l$ is a spring, securely attached at one end to the face of the ditching-wheel, thence coiled around the spade-shank $j$ to impart a quick rotary motion to the shank and spade to discharge the earth, and also so arranged as to hold the lower edge of the spade positively in position in a notch in a cam hereinafter described, in excavating and elevating the earth by drawing the spade downward. In other words, the spring $l$ is so arranged and coiled around the spade-shank as to impart a quick rotary motion to the spade to discharge the earth and at the same time draws the spade-shank and spade radially downward toward the center of the ditching-wheel.

$a'$ $a'$ represent a series of curved cams arranged on the outer rim of the ditching-wheel $d$ so that a cam lies under each spade. Each cam is provided with a notch, $a^2$, adapted to receive the lower edge of its spade and positively prevent it from turning in excavating and elevating the earth to form a ditch, the lower edge of the spade being held down in its notch by its spring $l$, which draws the spade downward. The lower end of each curved cam $a'$ is provided with a pin, $a^3$, which suddenly arrests the spade in its rotary movement, and thereby forces from its surface all particles of earth which might otherwise adhere to it.

$q$ represents a cam or inclined plane secured to the frame in the path of the inner ends of the spade-shanks; and $q'$ represents a rod adapted in the revolution of the ditching-wheel to engage with the bell-crank arms $i$ on the ends of the spade-shanks. In the forward movement of the ditching-wheel, the spades being in their notches, the cam $q$ raises each spade-shank successively, thereby raising each spade out of its notch when the spring imparts a rotary movement to the spade, which is suddenly arrested by the pin on the outer end of the cam, and the earth is discharged outside the ditch. In the further movement of the ditching-wheel the bell-crank arm $i$ strikes the rod $q'$, imparting a semi-rotary movement to the spade, carrying it backward over its notch, when the spring draws the spade downward into its notch.

The inner edges of the outer and inner rims, $h$ $h'$, of the ditching-wheel are connected together by a circular metallic ring or plate, $b'$, which may be made in one or several pieces, so constructed as to be readily removed and replaced. The object of employing the plate or plates $b'$ is to prevent earth from entering between the rims and interfering with the operation of the springs and spades.

To the rear end of the frame $c$ of the ditching-machine is secured the upper end of the circular chute $m$, which is concentric with the ditching-wheel and made convex in cross-section on its outer face and concave on its inner face, to conform with the convex form of the outer ends of the spades which fit closely to the chute, the width of the chute being the same, or near the same, as that of the spades, so that the sides $n$ of the chute will not extend out and force themselves into the sides of the ditch to any extent, and thereby require greater power to operate the machine.

$o$ $o$ are braces secured to the chute and frame $c$, to support the former.

$p$ $p$ represent guide-plates secured to the opposite sides of the frame $c$, near its rear end. These guide-plates are inclined inwardly, so as to come nearly in contact with the faces of the ditching-wheel. The function of the inclined guide-plates is twofold: first, to conduct the earth raised in the chute by the revolving spade on the ground outside of or beyond the ditch being excavated; and, secondly, the inclined plates act as scrapers for the side faces of the ditching-wheels.

$r$ represents a scoop the sides of which are pivoted to the sides $n$ of the chute, near its lower end. The forward cutting-edge of the scoop is oval or convex to cut into the earth more easily. The width of the scoop is about the same as the width of the spades, and the bottom of the scoop is rounding to leave the bottom of the ditch deeper in the middle than on the sides.

I do not claim, broadly, in this application the feature of the spade-shank secured to one side of the spade, as that feature forms the subject-matter of a claim in another application now pending in the United States Patent Office.

What I claim as my invention is—

1. The ditching-wheel $d$, provided with an outer rim, $h$, provided with semi-rotating spades, and made oval or convex in cross-section, substantially as described, and for the purpose set forth.

2. The combination, with the ditching-wheel $d$, provided on its circumference with a series of cams, $a'$, each having a notch, $a^2$, of the spades $k$, having shanks $j$ and springs $l$, whereby the spades are positively held in position across the rim in excavating a ditch and elevating the earth, substantially as described.

3. The combination, with the ditching-wheel $d$, provided on its circumference with a series of cams, $a'$, each having a notch, $a^2$, and pin $a^3$, of the spades $k$, having shanks $j$, spring $l$, and cam $q$, whereby each spade is raised out of its notch, semi-rotated, and its earth discharged, substantially as described.

4. The combination, with the ditching-wheel $d$, provided on its circumference with a series of cams, $a'$, each having a notch, $a^2$, and pin $a^3$, of the spades $k$, shanks $j$, having arms $i$, springs $l$, and rod $q'$, whereby each spade after discharging its earth is carried back over its notch and drawn down into it, substantially as described.

5. The combination, with the ditching-wheel $d$, provided with the outer convex rim, $h$, and inner rim, $h'$, each having a series of opposite holes, of the spades $k$, having shanks $j$, springs $l$, and plate $b'$, substantially as described, and for the purpose set forth.

6. The combination, with the ditching-wheel $d$, provided with the outer and inner rims, $h\ h'$, plate $b'$, and spades $k$, of the frame $c$ and outwardly-inclined guide-plates $p\ p$, serving the double purpose of guides to convey the raised earth outside the ditch and scrapers for the ditching-wheel, substantially as described.

7. The combination, with the ditching-wheel $d$, provided with the outer perforated convex rim, $h$, and inner rim, $h'$, ring $b'$, curved spades $k$, having convex cutting-edges, and shanks $j$, having crank-arms $i$, and cams $a'$, each having a notch, $a^2$, and pin $a^3$, of the curved chute $m$, having concave inner face, and inclined guide-plates and scrapers $p\ p$, substantially as described, and for the purpose set forth.

SAMUEL C. ROBINSON.

Witnesses:
NEWTON MILLER,
JOHN M. MONROE.